Patented June 5, 1945

2,377,709

UNITED STATES PATENT OFFICE 2,377,709

PIGMENTING COMPOSITIONS FOR TEXTILE FABRIC

Paul Louis Meunier, Wilmington, Del., assignor to E. I. du Pont de Nemours & Company, Wilmington, Del., a corporation of Delaware No Drawing. Application November 17, 1942, Serial No. 465,906

3 Claims. (Cl. 106—123)

This invention relates to pigment color pastes for such textile printing and dyeing processes wherein the color is applied to the fabric in the form of pigment jointly with water-dispersions of heat convertible starches, in other words, starch derivatives in which the hydrophilic groups have been blocked by organic radicals to convert the starch, when dried and heated upon the fiber, into a water-resistant film. Starch derivatives or starch preparations of this type and methods of producing them are described, for instance, in U. S. Patents Nos. 2,125,901, 2,292,921, and 2,267,277. It is the common property of such starch derivatives or preparations that while being soluble in water to facilitate their application to textile fabric, they become readily converted into water-insoluble films upon the fiber, if the latter is dried and heated to a temperature between 100 and 150° C.

The art of printing textile fabric with colored printing pastes based on a water-soluble gum, such as starch or gum-tragacanth, which is subsequently washed out of the fabric, is old and well known. A recent trend in the printing art, however, is to print fabric with printing pastes in which the pigment is dispersed in a heat-convertible starch, in other words, a starch modified to such an extent that upon drying it yields a water-insoluble film, and which consequently does not wash out but remains on the fabric as a permanent protection for the pigmented design imprinted. A similar process has been developed for pigment dyeing wherein the fabric is impregnated in an aqueous bath containing a pigment in dispersed form and also a modified starch of the mentioned type, so that upon drying the fiber a water-insoluble colored film is developed upon the fiber. Commercial examples of such modified starches are Shopal #8, Shopal #10, Shopal DRT, etc. (marketed by Stein, Hall & Co.), which are understood to be derivatives of starch, produced by blocking the hydrophilic groups of the starch with organic radicals and yielding, upon drying, water-resistant films. (See American Dyestuff Reporter, vol. 32, p. 96, February 15, 1943.) These starch derivatives are dried on the fabric at temperatures ranging from 170° F. to 210° F.; thus, they envelop the dispersed pigments in water-resistant films which bind the pigments to the cloth.

The advantages of such modified printing or dyeing methods are self-evident. They suffer, however, from the drawback that uniform dispersion of the pigment in starch derivative pastes of this type is difficult to obtain. Many pigments, especially those of the phthalocyanine series and many vat dyes, are by their nature difficult to disperse. Consequently the commercial color pastes of these pigments contain admixed therewith dispersing agents of the higher alcohol-sulfate type (Gardinols) or of the naphthalene-sulfonic-acid-formaldehyde condensation-product type (U. S. P. 2,213,693). In some of these colors, nevertheless, the pigment particles are flocculated to such an extent that, unless excessive quantities of the dispersing agent are employed, specky prints and considerable loss of strength result. While this condition may be improved by using an excess of said condensation product or by milling the pigment-dispersion-product or starch-derivative paste in a colloid mill or paint mill, or by high-speed agitation, such practices are expensive and objectionable, since they cause an initial thinning of the printing paste and furthermore increase its tendency to gel upon standing. In the case of printing, excessive reductions in printing paste viscosity are objectionable because they invariably result in weaker, duller prints, due to excessive penetration of the fabric. Thickening, on the other hand, renders the printing paste mechanically inapplicable.

Accordingly, this invention has for an object to provide a method for the dispersion of water-insoluble pigments in binders of starch origin which deposit water-resistant films upon drying. A further object is to accomplish this dispersion without causing undesirable viscosity variations in the starch derivative vehicle, e. g., initial thinning with large excesses of dispersing agent or through milling of the paste, or on the other hand thickening upon standing (gelation). A further object is to effect the dispersion of the pigment without introducing large quantities of auxiliary agents, which require removal by washing after the printing or dyeing operation. A further object is to effect and maintain the dispersion of pigments in the starch derivative vehicles by means of a reagent which is universally effective with a wide variety of pigments and which is not readily affected by variations in the pH of the system.

Now, according to the present invention, the above and further objects of this invention are accomplished neatly by adding to the commercial color paste of the water-insoluble organic pigment, in lieu of or in addition to the customary dispersing agents but preferably prior to its incorporation with said heat-convertible starch type printing paste, a member of the group consisting of the lignin-sulfonic acids and water-soluble salts thereof.

The excellent performance of lignin-sulfonic acid and its water-soluble salts for the purpose of this invention is both unique and unexpected. For although lignin-sulfonic acid and its salts are well known as anti-coagulants, other agents which belong in the same classification perform to a much inferior degree or accomplish only some, but not all, the objects of this invention. Thus, I have tested protective agents of the following types:

Triethanolamine-lauric acid ester,
Methylol urea-protein formaldehyde condensation product (a commercial dispersing agent),
Sulfonated ortho-benzoyl-benzoic acid,
Stearamido-methyl-pyridinium-bromide, and found that in each case their performance was inferior to lignin-sulfonic acid or its tri-sodium salt as regards the tinctorial strength obtained in the starch derivative vehicle and also as regards the adverse effects of these protective agents on the starch derivative itself; i. e., thinning, gelling, and variations in the "length" of the printing pastes. "Length" is a test applied in practice by the printer to determine the printing qualities of the paste.

In addition to the above superiority, the lignin-sulfonic acids (or soluble salts thereof) when used in this invention are apparently less affected by variations in pH than the other agents listed above. This important advantage has been demonstrated by a series of experiments in which the pH of the color dispersion was purposely varied in order to study its effect on incorporation of such color dispersion with the starch derivative binders above defined. It was found that with each of the agents above, a printing paste deliberately acidified to a pH of about 3.0 gave a print of far less strength and speckled to a much greater degree than when the same agent was employed at its normal pH in the resulting paste (5 to 7). In the cases, however, of lignin-sulfonic acid and its trisodium salt, tested under similar conditions, prints of substantially the same high quality were obtained regardless of the pH value of the paste.

Without limiting my invention, the following examples are typical of my preferred process. Parts mentioned are by weight.

In these examples where lignin-sulfonic acid is specified, the product known as Hornkem #1 (Horn Research Laboratories, Inc., Long Island, New York), which is believed to be a purified lignin-sulfonic acid, was used by me. Representing the salt, Daxad #23, produced by Dewey & Almy Co., and believed to be the trisodium salt of lignin-sulfonic acid was employed.

Example 1

A pigment color paste is prepared as follows:

| | Parts |
|---|---|
| Metal-free phthalocyanine press cake (dry basis) | 20 |
| Water | 75 |
| Lignin-sulfonic acid, trisodium salt | 5 |
| Total | 100 |

The above ingredients are milled together in a colloid mill, and the composition is then added to 900 parts of a 5% aqueous dispersion of a heat-convertible starch-derivative binder, e. g., Shopal #8.

The pigment color paste and starch derivative are mixed together in an open vessel by stirring slowly. The pigment color disperses uniformly throughout the composition, producing a strong coloration in a few minutes. The printing paste thus prepared is printed on textile fabric, e. g., cotton, cellulose ester, nylon, regenerated cellulose, silk, wool, etc. from an engraved printing roller. The printed fabric is then passed over steam heated cans, at a temperature of 170 to 210° F., to dry the colored starch derivative into a water-insoluble film on the fabric.

Prints thus produced are stronger, brighter, smoother and leveler than prints produced from pigment color pastes containing no lignin-sulfonic acid (or salt), i. e., a metal-free phthalocyanine paste containing only a naphthalene sulfonic acid-formaldehyde condensation product as dispersing agent.

Example 2

| | Parts |
|---|---|
| Metal free phthalocyanine pulp (dry basis) | 20.0 |
| Water | 78.7 |
| Naphthalene sulfonic acid-formaldehyde condensation product | 0.3 |
| Lignin sulfonic acid trisodium salt | 1.0 |
| Total | 100.0 |

The lignin-sulfonic acid trisodium salt is added to a mixture of the other ingredients, and the entire composition is milled in a colloid mill until uniform. The resulting composition is then added to 900 parts of a starch derivative binder paste as in Example 1 and prints are produced in the manner described in said example. The printing paste possesses advantageous properties similar to those of Example 1 and the resulting prints possess similar advantages in strength, brilliance, smoothness, and levelness over prints produced from the same pigment and binder without the aid of lignin-sulfonic acid (or salt thereof).

Example 3

| | Parts |
|---|---|
| Copper phthalocyanine pulp (dry basis) | 20.0 |
| Naphthalene sulfonic acid-formaldehyde condensation product | 1.5 |
| Water | 75.5 |
| Lignin-sulfonic acid or salt (dry basis) | 3.0 |
| Total | 100.0 |

The lignin-sulfonic acid (or salt) is added to a mixture of the other ingredients, and the entire composition is milled in a Follows and Bates mill until uniform.

10 parts of this paste are incorporated with 990 parts of a starch-derivative binder paste (5%), for instance the binder represented by Shopal #8 or Shopal #10, marketed by Stein, Hall & Co. (These are believed to be derivatives of starch, produced by starch to such an extent as to produce, upon drying, water-resistant films.) The resulting printing paste is printed on textile fabric from an engraved roller, and the printed material is dried at 170 to 210° F. The prints obtained are much leveler, stronger and appreciably brighter than prints obtained with printing pastes prepared from the same color and binder in the normal way, i. e., by using the same dispersing agent without the aid of lignin-sulfonic acid or its salts. Furthermore, the printing results obtained with lignin-sulfonic acids or their salts are superior to those produced by using in their stead any of the other protective agents above listed.

In a similar manner my invention may be applied to improve the process and results obtained in pigment-dyeing of fabric by the aid of modified starch binders. The essential difference between such dyeing processes and the printing processes above illustrated is that a less viscous modified starch binder is employed, so that upon dispersion in the aqueous dye bath to a concentration of, say, between 1 to 6%, the resulting bath is still sufficiently fluid to be employed as a dyeing bath, as contrasted to a printing paste. The following additional example will illustrate the procedure in this type of dyeing.

*Example 4*

3.0 parts of lignin-sulfonic acid (or a salt thereof) are milled in a colloid mill with a mixture of 20.0 parts of copper phthalocyanine, 1.5 parts of naphthalene-sulfonic-acid-formaldehyde condensation product and 75.5 parts of water as in Example 3. The resulting color paste is incorporated into 900 parts of a 5% dispersion of "Shopal DRT" in water, by slow stirring as in Example 1. Textile fiber, for example, cotton, regenerated cellulose, cellulose acetate, nylon, silk or wool, is passed through the resulting dye bath and then through squeeze rollers to remove excess liquor. The fiber is then passed over drying drums at a temperature of 170 to 210° F. The dyeing produced in this manner is stronger, brighter and leveler than dyeings obtained from the same color and a similar pigment-dyeing bath but without the aid of lignin-sulfonic acid or a salt thereof.

It will be understood that the above examples are merely illustrative and that the details of procedure or composition may be varied considerably within the skill of those engaged in this art. For instance, the proportion of lignin-sulfonic acid (or salt) to pigment in the color paste may vary from 0.025 to 0.25 by weight. The ratio of pigment to modified starch binder in the eventual printing paste or dyeing bath may vary from 0.02 to 0.5 by weight on dry basis.

The incorporation of the lignin-sulfonic acid or its salt with the pigment may be achieved by milling in a colloid mill, as above specified, or by means of dry milling (milling the dry pigment with the dry protective agent), viscous milling (by means of a Werner and Pfleiderer mixer), or any of the other known methods of incorporating such materials with pigments. The incorporation of the lignin-sulfonic acid (or salt) with the pigment may also be satisfactorily accomplished by high-speed agitation instead of milling.

The effective concentrations of lignin-sulfonic acids and their salts may vary considerably with the type of pigment involved; and in the average case it can be shown that these protective agents are much more consistent in their operative scope than those other agents described above (triethanolamine-lauric acid ester, etc.). Following are the operative concentrations of our preferred anti-coagulants, i. e., lignin-sulfonic acids and their salts, as applied to several pigment colors both for printing and for pigment-dyeing.

| | Operative concentrations of lignin-sulfonic acid or the trisodium salt (per cent by weight of color composition before incorporating the modified starch binder) |
|---|---|
| | *Per cent* |
| Copper phthalocyanine, 20% paste | 1 to 3 |
| Highly chlorinated copper phthalocyanine, 20% paste | 1 to 3 |
| Benzidine Yellow (3,3'-dichloro-benzidine tetrazotized and coupled to 2 moles of aceto-acetanilide), 20% paste | 0.5 to 2 |
| Metal-free phthalocyanine, 20% paste | 1 to 3 |
| Mono-chlorinated Indanthrone, 16.5% paste (Col. Ind. #1113) | 2 to 4 |
| Naphthol Red (p-nitro-o-toluidine diazotized and coupled to p-chloro-anilide of 2,3-hydroxy-naphthoic acid) | 0.5 to 2 |
| Vat Yellow, Col. Ind. #1132, 20% paste | 0.5 to 3 |
| Thioindigoid Pink (Prototype #109, 1940 Yearbook, Am. Ass'n Text. Chem. & Color.), 14% paste | 0.2 to 1.5 |
| Vat Red (Prototype #124, ibid), 20% paste | 2.0 to 5.0 |
| Benzidine Orange (3,3'-dichloro-benzidine tetrazotized and coupled to 2 moles of 1-phenyl-3-methyl-5-pyrazolone), 20% paste | 0.5 to 2 |

The mechanism of the chemical or physical phenomena which might account for the valuable behavior of the lignin-sulfonic acid (or salt) is not known but it is believed that these substances coat the individual pigment particles and prevent them from being affected by electrical charges, pH changes within the system, or the forces which cause gelation in a colloidal system such as are obtained with the heat-convertible starch binders.

However, regardless of theory, the pigment dispersions with lignin-sulfonic acids (or salts) described above have the following distinct advantages over other types of dispersing agents and dispersions when used with the above-mentioned modified starch binders:

1. Greater ease of incorporation: This means that mixing with simple agitation, such as a slow paddle mixer, produces a uniform dispersion of the pigment in the binder. Uniformity of the dispersion is shown by the absence of flocculation when examined under the microscope and strong, full and bright prints, free from specks.

2. Smoother prints and dyeings; "longer" printing pastes; and more stable printing pastes and pigment-dye baths. For example, the naphthalene-sulfonic acid-formaldehyde condensation products cause the printing pastes to "set-up" or become gelled on standing, while the pastes prepared with the mentioned lignin derivatives either remain unchanged or become gelled to only a comparatively slight degree.

3. Prevention of flocculation of pigment in the dye bath or printing paste, regardless whether the free lignin-sulfonic acids are used at pH values as low as 2.0 or whether the neutral salts, e. g., trisodium lignin-sulfonate (pH=about 7.0), are used. Other agents are very sensitive to pH variation on the acid side (pH 3.0; see above).

4. Effective range of concentrations of the protective agent is low. (See above table, listing effective concentrations.)

I claim as my invention:

1. A pigmenting composition for textile fabric, comprising a water-insoluble organic pigment, water, a heat-convertible starch derivative, and a capillary-active agent, said heat-convertible starch derivative being a water-insoluble, partially esterified starch characterized by the property of forming a water-resistant film upon drying, and said capillary-active agent consisting at least in its major portion of a member selected from the group consisting of lignin-sulfonic acid and its water-soluble salts, the proportion of pigment to starch derivative by weight being between 0.02:1 and 0.50:1, and the proportion of said capillary-active agent being from 1/40 to 1/4 by weight of the dry pigment.

2. A pigmenting composition as in claim 1, the capillary-active agent comprising a mixture of a member of the group consisting of formaldehyde-naphthalene-sulfonic-acid condensation product and water-soluble salts thereof on the one hand, and a member of the group consisting of lignin-sulfonic acid and water-soluble salts thereof on the other hand.

3. A pigmenting composition for textile fabric comprising water, a pigment of the phthalocyanine series, a heat-convertible starch-derivative being a partially esterified starch and being adapted to produce a water-resistant film upon heating after application to the textile fiber, and a mixture of capillary-active agents comprising on the one hand a member of the group consisting of formaldehyde-naphthalene-sulfonic acid condensation product and its water-soluble salts and on the other hand a member of the group consisting of lignin-sulfonic acid and its water-soluble salts, the quantity of the second-mentioned component of said mixture being from 1 to 3 parts by weight for each 20 parts by weight of said pigment, and the quantity of pigment being between 2 and 50 parts by weight for each 100 parts by weight of said heat-convertible starch-derivative.

PAUL LOUIS MEUNIER.

CERTIFICATE OF CORRECTION.

Patent No. 2,377,709.     June 5, 1945.

PAUL LOUIS MEUNIER.

It is hereby certified that error appears in the printed specification of the above numbered patent requiring correction as follows: Page 2, second column, line 69, after the word "by" insert --partially esterifying--; and that the said Letters Patent should be read with this correction therein that the same may conform to the record of the case in the Patent Office.

Signed and sealed this 18th day of September, A. D. 1945.

Leslie Frazer (Seal)     First Assistant Commissioner of Patents.

ing, and said capillary-active agent consisting at least in its major portion of a member selected from the group consisting of lignin-sulfonic acid and its water-soluble salts, the proportion of pigment to starch derivative by weight being between 0.02:1 and 0.50:1, and the proportion of said capillary-active agent being from 1/40 to 1/4 by weight of the dry pigment.

2. A pigmenting composition as in claim 1, the capillary-active agent comprising a mixture of a member of the group consisting of formaldehyde-naphthalene-sulfonic-acid condensation product and water-soluble salts thereof on the one hand, and a member of the group consisting of lignin-sulfonic acid and water-soluble salts thereof on the other hand.

3. A pigmenting composition for textile fabric comprising water, a pigment of the phthalocyanine series, a heat-convertible starch-derivative being a partially esterified starch and being adapted to produce a water-resistant film upon heating after application to the textile fiber, and a mixture of capillary-active agents comprising on the one hand a member of the group consisting of formaldehyde-naphthalene-sulfonic acid condensation product and its water-soluble salts and on the other hand a member of the group consisting of lignin-sulfonic acid and its water-soluble salts, the quantity of the second-mentioned component of said mixture being from 1 to 3 parts by weight for each 20 parts by weight of said pigment, and the quantity of pigment being between 2 and 50 parts by weight for each 100 parts by weight of said heat-convertible starch-derivative.

PAUL LOUIS MEUNIER.

CERTIFICATE OF CORRECTION.

Patent No. 2,377,709.   June 5, 1945.

PAUL LOUIS MEUNIER.

It is hereby certified that error appears in the printed specification of the above numbered patent requiring correction as follows: Page 2, second column, line 69, after the word "by" insert --partially esterifying--; and that the said Letters Patent should be read with this correction therein that the same may conform to the record of the case in the Patent Office.

Signed and sealed this 18th day of September, A. D. 1945.

Leslie Frazer (Seal)    First Assistant Commissioner of Patents.